(12) United States Patent
Cha

(10) Patent No.: US 11,136,898 B2
(45) Date of Patent: Oct. 5, 2021

(54) SEALING GAS SUPPLY APPARATUS

(71) Applicant: DOOSAN HEAVY INDUSTRIES & CONSTRUCTION CO., LTD., Changwon-si (KR)

(72) Inventor: Song Hun Cha, Osan-si (KR)

(*) Notice: Subject to any disclaimer, the term of this patent is extended or adjusted under 35 U.S.C. 154(b) by 870 days.

(21) Appl. No.: 15/924,286

(22) Filed: Mar. 19, 2018

(65) Prior Publication Data

US 2018/0266566 A1    Sep. 20, 2018

(30) Foreign Application Priority Data

Mar. 20, 2017 (KR) .......................... 10-2017-0034737

(51) Int. Cl.
*F01D 11/06* (2006.01)
*F16J 15/40* (2006.01)
(Continued)

(52) U.S. Cl.
CPC .............. *F01D 11/06* (2013.01); *F01D 11/02* (2013.01); *F01D 11/04* (2013.01); *F01D 25/183* (2013.01);
(Continued)

(58) Field of Classification Search
CPC .......... F01D 11/06; F01D 11/02; F01D 11/04; F01D 25/183; F01D 25/18; F01K 25/103;
(Continued)

(56) References Cited

U.S. PATENT DOCUMENTS 4,793,141 A * 12/1988 Yanai ...................... F01D 11/04
60/646
7,861,536 B2 * 1/2011 Alecu ...................... F02C 6/08
60/806
(Continued)

FOREIGN PATENT DOCUMENTS

CN        203835469 U    9/2014
JP        S63-167003 A   7/1988
(Continued)

OTHER PUBLICATIONS

A Japanese Notification of Reasons for Refusal dated Feb. 28, 2019 in connection with Japanese Patent Application No. 2018-052405 which corresponds to the above-referenced U.S. application.

*Primary Examiner* — Igor Kershteyn
*Assistant Examiner* — Joshua R Beebe
(74) *Attorney, Agent, or Firm* — Harvest IP Law, LLP

(57) ABSTRACT

Disclosed herein is a sealing gas supply apparatus. In the sealing gas supply apparatus for supplying sealing gas to a turbomachine of a power generation system, a source comprises at least one low-temperature source for supplying a working fluid to the sealing gas supply apparatus and at least one high-temperature source for supplying a working fluid having a higher temperature than the low-temperature source to the sealing gas supply apparatus, and the working fluids are mixed in the sealing gas supply apparatus to be suitable for a sealing condition as a temperature condition required in a sealing system so as to be supplied to the sealing system of the turbomachine. In accordance with the (Continued)

present disclosure, since separate electric power is not consumed during normal operation by improving a turbine sealing gas source, it is possible to enhance power generation performance by a reduction in power consumption.

16 Claims, 10 Drawing Sheets

(51) Int. Cl.
*F01D 25/18* (2006.01)
*F01D 11/02* (2006.01)
*F01D 11/04* (2006.01)
*F01K 25/10* (2006.01)

(52) U.S. Cl.
CPC ............ *F01K 25/103* (2013.01); *F16J 15/40* (2013.01); *F05D 2220/76* (2013.01); *F05D 2240/55* (2013.01); *F05D 2260/85* (2013.01); *F05D 2270/094* (2013.01); *F16J 15/406* (2013.01)

(58) Field of Classification Search
CPC ...... F16J 15/40; F16J 15/406; F05D 2220/76; F05D 2260/85; F05D 2270/094
See application file for complete search history.

(56) References Cited

U.S. PATENT DOCUMENTS

| 8,794,009 | B2* | 8/2014 | Glahn | F02C 9/18 60/782 |
|---|---|---|---|---|
| 2008/0202092 | A1* | 8/2008 | Eluripati | F01D 25/12 60/39.83 |
| 2008/0264094 | A1* | 10/2008 | Campagna | F02G 5/02 62/402 |
| 2012/0112575 | A1* | 5/2012 | Blewett | H02K 9/06 310/62 |
| 2012/0279228 | A1* | 11/2012 | Ferra | F02C 6/06 60/772 |

FOREIGN PATENT DOCUMENTS

| JP | 2001090507 A | 4/2001 |
|---|---|---|
| JP | 2010133315 A | 6/2010 |
| KR | 20160028999 A | 3/2016 |

\* cited by examiner

SEALING GAS SUPPLY APPARATUS

CROSS-REFERENCE(S) TO RELATED APPLICATIONS

This application claims priority to Korean Patent Application No. 10-2017-0034737, filed on Mar. 20, 2017, the disclosure of which is incorporated herein by reference in its entirety.

BACKGROUND OF THE DISCLOSURE

Field of the Disclosure

Exemplary embodiments of the present disclosure relate to a sealing gas supply apparatus.

Description of the Related Art

Internationally, the need to efficiently produce electric power has gradually increased, and various efforts have been made to reduce generation of pollutants and to increase power production since activities for reducing generation of pollutants are gradually increasing. As a part of these efforts, power generation systems using supercritical carbon dioxide ($CO_2$), which utilize supercritical carbon dioxide as a working fluid, have been actively researched and developed.

Since supercritical carbon dioxide has a density similar to that of liquid as well as a viscosity similar to that of gas, it is possible to reduce the size of devices and to minimize the consumption of electric power required for compression and circulation of fluid. In addition, supercritical carbon dioxide has an advantage in that it is easy to handle supercritical carbon dioxide since it has a lower critical point of 31.4° C. and 72.8 atmospheres, compared to water having the critical point of 373.95° C. and 217.7 atmospheres. When such a power generation system using supercritical carbon dioxide is operated at the temperature of 550° C., the system has a net power generation efficiency of about 45%. In addition, the power generation system is advantageous in that it is possible to improve its power generation efficiency by more than 20%, compared to an existing steam cycle, and to reduce the size of a turbomachine of the system.

The power generation system using supercritical carbon dioxide generally forms a closed cycle, in which the carbon dioxide used for power generation is not discharged to outside, and the system uses supercritical carbon dioxide as a working fluid.

The working fluid supplied into a power generation cycle of the system serves two purposes of driving the turbomachine and of bearing lubrication and sealing of the turbomachine. An example method of supplying a working fluid is disclosed in U.S. Pat. No. 8,281,593.

SUMMARY OF THE DISCLOSURE

The high-pressure working fluid used to seal the turbomachine is typically heated and supplied to the sealing system of the turbomachine by a dry gas seal conditioner. For the heating of the working fluid, 1 to 3% of electric power produced in the power generation cycle is used according to the size of the dry gas seal conditioner. For instance, electric power of 40 to 80 kW is consumed for a 1.5 to 5 MW conditioner. Accordingly, since the use of such power causes a reduction of power generation efficiency in terms of the total efficiency of the power generation cycle, it may be necessary to resolve this issue.

An object of the present disclosure is to provide a sealing gas supply apparatus capable of enhancing power generation performance by improving a turbine sealing gas source.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a sealing gas supply apparatus supplies sealing gas to a turbomachine of a power generation system, wherein a source comprises at least one low-temperature source for supplying a working fluid to the sealing gas supply apparatus and at least one high-temperature source for supplying a working fluid having a higher temperature than the low-temperature source to the sealing gas supply apparatus, and the working fluids are mixed in the sealing gas supply apparatus to be suitable for a sealing condition as a temperature condition required in a sealing system so as to be supplied to the sealing system of the turbomachine.

The low-temperature source may be a working fluid supply pump, which is connected to a storage tank storing the working fluid, or a main pump of the power generation system, and the high-temperature source may be a turbine inlet or recuperator outlet of the power generation system.

The sealing gas supply apparatus may comprise a heat exchanger for heating the working fluid supplied from the low-temperature source, and a cooling fan for cooling the working fluid supplied from the high-temperature source.

The heat exchanger and the cooling fan may be operated only in case of startup or emergency of the power generation system.

The sealing gas supply apparatus may comprise a first valve installed in a working fluid transfer pipe connected to the low-temperature source, a heat exchanger through which the working fluid passing through the first valve passes, and a control valve for controlling a flow rate of the working fluid passing through the heat exchanger and the first valve.

The sealing gas supply apparatus may comprise a fourth valve installed in a working fluid transfer pipe connected to the high-temperature source, a cooling fan through which the working fluid passing through the fourth valve passes, and a control valve for controlling a flow rate of the working fluid passing through the cooling fan and the fourth valve.

The working fluids passing through the respective control valves may be mixed suitably for the sealing condition to be supplied to the sealing system.

The sealing gas supply apparatus may comprise a first valve installed in a working fluid transfer pipe connected to the low-temperature source, a fourth valve installed in a working fluid transfer pipe connected to the high-temperature source, a heat exchanger through which the working fluid mixed through the first and fourth valves passes, a cooling fan through which the working fluid passing through the heat exchanger passes, a first control valve for controlling a flow rate of the working fluid branched from an inlet of the heat exchanger, and a third control valve for controlling a flow rate of the working fluid passing through the cooling fan, wherein the working fluids passing through the first and third control valves may be mixed suitably for the sealing condition to be supplied to the sealing system.

The sealing gas supply apparatus may comprise a first valve installed in a working fluid transfer pipe connected to the low-temperature source, a fourth valve installed in a working fluid transfer pipe connected to the high-temperature source, a heat exchanger through which the working fluid mixed through the first and fourth valves passes, a cooling fan through which the working fluid passing through the heat exchanger passes, a second control valve disposed at an outlet of the heat exchanger, a fourth control valve disposed at an outlet of the cooling fan, a first control valve for controlling a flow rate of the working fluid branched from an inlet of the heat exchanger, and a third control valve for controlling a flow rate of the working fluid branched from an inlet of the cooling fan.

The working fluid passing through the first control valve may join at an outlet of the second control valve, and the working fluid passing through the third control valve may join at an outlet of the fourth control valve.

In accordance with another aspect of the present disclosure, a sealing gas supply apparatus supplies sealing gas to a turbomachine, wherein a source comprises a plurality of low-temperature sources for supplying working fluids to the sealing gas supply apparatus and a plurality of high-temperature sources for supplying working fluids having a higher temperature than the low-temperature sources to the sealing gas supply apparatus, and the working fluids supplied from the low-temperature sources are heated and the working fluids supplied from the high-temperature sources are cooled so that the working fluids are mixed suitably for a sealing condition as a temperature condition required in a sealing system of the turbomachine and then supplied to the sealing system.

The low-temperature sources may be a working fluid supply pump, which is connected to a storage tank storing the working fluid, and a main pump of a power generation cycle, and the high-temperature sources may be a turbine inlet and recuperator outlet of the power generation cycle.

The sealing gas supply apparatus may comprise a heat exchanger for heating the working fluids supplied from the low-temperature sources, and a cooling fan for cooling the working fluids supplied from the high-temperature sources.

The heat exchanger and the cooling fan may be operated only in case of startup or emergency of the power generation cycle.

The sealing gas supply apparatus may comprise first and second valves installed in respective working fluid transfer pipes connected to the low-temperature sources, a heat exchanger through which a portion of the working fluids passing through the first and second valves passes, and control valves for respectively controlling a flow rate of the working fluid passing through the heat exchanger and a flow rate of the working fluid which does not pass through the heat exchanger.

The sealing gas supply apparatus may comprise third and fourth valves installed in respective working fluid transfer pipes connected to the high-temperature sources, a cooling fan through which a portion of the working fluids passing through the third and fourth valves passes, and control valves for respectively controlling a flow rate of the working fluid passing through the cooling fan and a flow rate of the working fluid which does not pass through the cooling fan.

The working fluids passing through the respective control valves may be mixed suitably for the sealing condition to be supplied to the sealing system.

The sealing gas supply apparatus may comprise first and second valves installed in respective working fluid transfer pipes connected to the low-temperature sources, third and fourth valves installed in respective working fluid transfer pipes connected to the high-temperature sources, a heat exchanger through which the working fluids passing through the first and second valves pass, a first control valve disposed at an outlet of the heat exchanger to control a flow rate of the working fluid passing through the heat exchanger, a cooling fan through which the working fluids passing through the third and fourth valves pass, and a third control valve disposed at an outlet of the cooling fan to control a flow rate of the working fluid passing through the cooling fan.

The working fluids passing through the first and third control valves may be mixed suitably for the sealing condition to be supplied to the sealing system.

The sealing gas supply apparatus may comprise first and second valves installed in respective working fluid transfer pipes connected to the low-temperature sources, third and fourth valves installed in respective working fluid transfer pipes connected to the high-temperature sources, a heat exchanger through which the working fluids passing through the first to fourth valves pass, a cooling fan installed at an outlet of the heat exchanger, and a third control valve installed at an outlet of the cooling fan to control a flow rate of the working fluid passing through the cooling fan.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
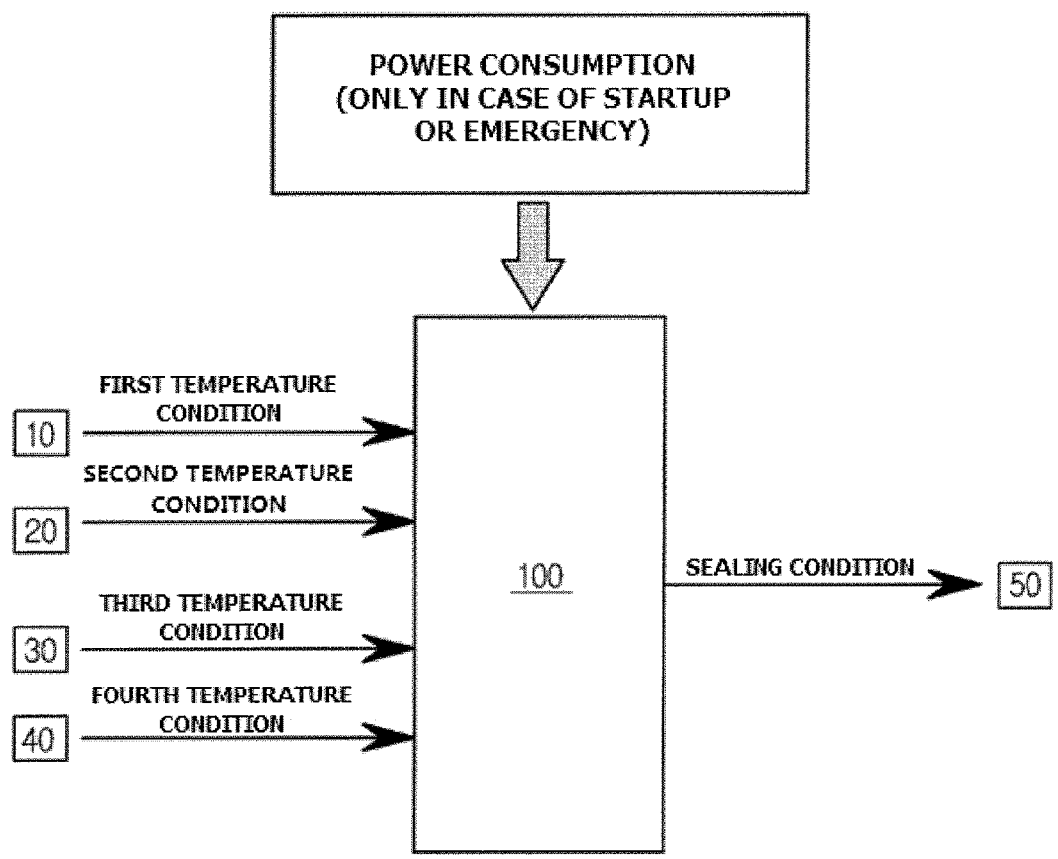
FIG. 1 is a diagram illustrating a sealing gas supply apparatus according to a first embodiment of the present disclosure.

Reference will now be made in detail to exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a sealing gas supply apparatus according to various embodiments of the present disclosure will be described in detail with reference to the accompanying drawings.

The power generation system using supercritical carbon dioxide used herein according to various embodiments of the present disclosure includes a system, where most of working fluids are supercritical fluids and the remainder is a subcritical fluid as well as a system where all working fluids flowing in a cycle are supercritical fluids.

In addition, carbon dioxide is used as a working fluid in various embodiment of the present disclosure. The term "carbon dioxide" used herein includes pure carbon dioxide in a chemical sense, carbon dioxide with few impurities in a general sense, and carbon dioxide mixed with one or more fluids as additives. Similarly, the sealing gas to be described below also includes the above conditions.

The working fluid is supplied into the power generation system using supercritical carbon dioxide for a turbomachine and for production of electric power in the power generation system using supercritical carbon dioxide.

The working fluid is supplied to a bearing system of the turbomachine for use to lubricate each component of the turbomachine, and it is supplied to a sealing system of the turbomachine to seal the turbomachine.

The high-pressure working fluid for sealing is typically heated and supplied to the sealing system of the turbomachine by a dry gas seal conditioner.

Working fluids are introduced into the dry gas seal conditioner through two paths from a main pump for working fluid and a working fluid supply pump connected to a storage tank storing the working fluids. For example, working fluids having a temperature of about −20° C. to 40° C. may be supplied through the two paths, where the temperature of the working fluid in the storage tank may range from −60° C. to 50° C., whereas the temperature of the working fluid at the rear end of the supply pump may range from −50° C. to 100° C. In addition, the working fluid may be heated to a temperature of about 90° C.±10° C. in the dry gas seal conditioner and then be supplied to the turbomachine. It is appreciated that the above temperature condition is illustrated by way of example, and the temperature required for the turbomachine, such as 100° C., 200° C., or 300° C., may be varied according to the design choice of the turbomachine. In addition, since the working fluids are continuously heated in the dry gas seal conditioner, electric power is continuously consumed.

Figure 2:
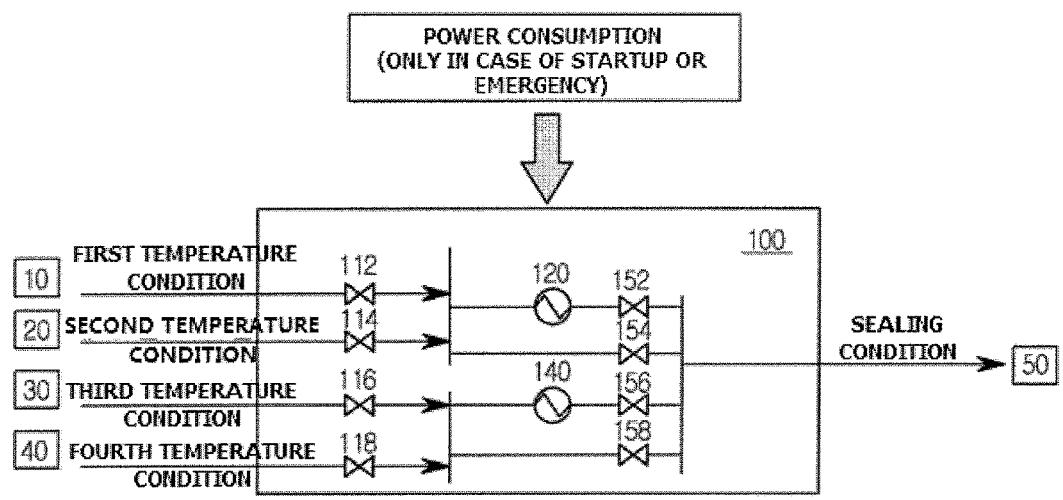
FIG. 2 is a diagram illustrating a first example of the structure of the sealing gas supply apparatus of FIG. 1.

FIG. 1 is a diagram illustrating a sealing gas supply apparatus 100 according to a first embodiment of the present disclosure. FIG. 2 is a diagram illustrating a first example of the structure of the sealing gas supply apparatus 100 of FIG. 1.

As illustrated in FIG. 1, in the sealing gas supply apparatus 100 according to the first embodiment of the present disclosure, working fluids are supplied to the sealing gas supply apparatus 100 through the total of four paths under different temperature conditions. For the sake of convenience, the sealing gas before introduction to the sealing gas supply apparatus 100 is defined as a "working fluid," whereas the sealing gas supplied to a turbomachine after passing through the sealing gas supply apparatus 100 is defined as "sealing gas".

In a first path, the working fluid is introduced from a working fluid supply pump 10, which is connected a storage tank storing the working fluid, into the sealing gas supply apparatus 100 under a first temperature condition. The first temperature condition may range from −20° C. to 40° C.

In a second path, a working fluid is introduced from a main pump 20 of a power generation cycle into the sealing gas supply apparatus 100 under a second temperature condition. The second temperature condition may range from −20° C. to 40° C.

In a third path, a working fluid is introduced from a turbine inlet 30 of the power generation cycle into the sealing gas supply apparatus 100 under a third temperature condition. The third temperature condition may range from 250° C. to 400° C.

In a fourth path, a working fluid is introduced from a recuperator outlet 40 of the power generation cycle into the sealing gas supply apparatus 100 under a fourth temperature condition. The fourth temperature condition may range from 100° C. to 250° C.

The working fluid supply pump and the main pump in the first and second paths serve as working fluid sources having a relatively low temperature, compared to the turbine inlet and the recuperator outlet in the third and fourth paths. Therefore, it may be possible to set the sealing gas to a desired temperature by mixing a working fluid having a relatively low temperature with a working fluid having a high temperature.

In more detail, the working fluids are supplied to the sealing gas supply apparatus 100 under the first to fourth temperature conditions, and the sealing gas supplied to a sealing system 50 of the turbomachine controls the flow rate of the working fluid for each introduction path in the sealing gas supply apparatus 100 to have a temperature suitable for a sealing condition. The sealing condition may be in a temperature range of 90° C.±10° C. suitable for the sealing system 50.

To control the flow rate of the working fluid for each supply path, the sealing gas supply apparatus 100 comprises a first valve 112 that is installed in a working fluid transfer pipe in the first path, a second valve 114 that is installed in a working fluid transfer pipe in the second path, a third valve 116 that is installed in a working fluid transfer pipe in the third path, and a fourth valve 118 that is installed in a working fluid transfer pipe in the fourth path.

The working fluid exiting the first valve 112 passes through a heat exchanger 120 and a first control valve 152, and the working fluid exiting the second valve 114 passes through a second control valve 154. The working fluid exiting the third valve 116 passes through a cooling fan 140 and a third control valve 156, and the working fluid exiting the fourth valve 118 passes through a fourth control valve 158. The working fluids having passed through the first to fourth control valves 152 to 158 are mixed suitably for the sealing condition and then supplied from the sealing gas supply apparatus 100 to the sealing system 50.

The first to fourth valves 112 to 118 are provided to control the flow rates of the working fluids introduced into the sealing gas supply apparatus 100 to block the working fluids. The first to fourth control valves 152 to 158 are also provided to control the flow rates of the working fluids so as to be suitable for the sealing condition. The heat exchanger 120 is a heater that consumes electric power, and the cooling fan 140 also consumes electric power. The heat exchanger 120 and the cooling fan 140 are arranged in parallel.

In case of a startup or emergency of a power generation cycle, it may be possible to heat or cool the working fluid for each introduction path by supplying electric power to the heat exchanger 120 or the cooling fan 140. Otherwise, it is possible to control the temperature of sealing gas discharged from the sealing gas supply apparatus 100 so as to be suitable for the sealing condition by controlling the flow rates of the working fluids using the first to fourth control valves 152 to 158 without separately heating the working fluids. That is, during the normal operation, the working fluid merely passes through the heat exchanger 120 or the cooling fan 140 without heating or cooling therein, where this is being commonly applied to the various embodiments of the present disclosure.

Accordingly, the present disclosure is advantageous in that the electric power of the power generation system is consumed only in case of startup or emergency of the power generation cycle, whereas the electric power is not separately or additionally consumed during its normal operation. When the sealing gas supply apparatus 100 is operated under this condition, it may be possible to reduce the electric energy required to operate the sealing gas supply apparatus 100 by about 0.1 to 0.4%. As a result, it may be possible to enhance the performance of the power generation system by about 1 to 2.5% of electric power produced therein.

Besides, it may be possible to match the sealing gas for the sealing condition without additional power consumption by configuring the sealing gas supply apparatus 100 as follows.

Figure 3:
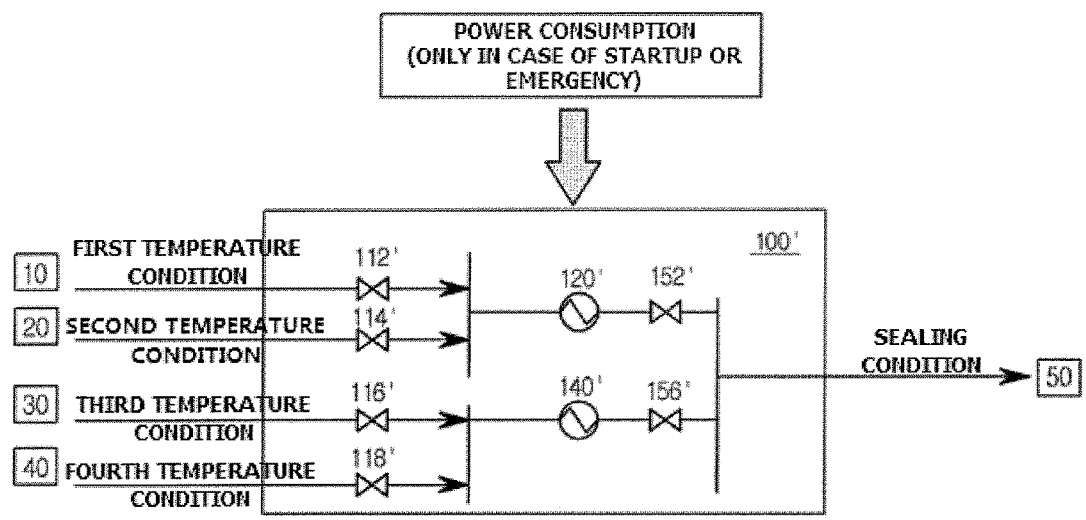
FIG. 3 is a diagram illustrating a second example of the structure of the sealing gas supply apparatus of FIG. 1.

FIG. 3 is a diagram illustrating a second example of the structure of the sealing gas supply apparatus according to FIG. 1.

As illustrated in FIG. 3, the sealing gas supply apparatus 100' comprise first to fourth valves 112' to 118', a heat exchanger 120', a cooling fan 140', a first control valve 152', and a third control valve 156'. The sealing gas supply apparatus 100' may form a path, in which the working fluids having passed through or exiting the first and second valves 112' and 114' are mixed and pass through the heat exchanger 120' and the first control valve 152' as well as a path in which the working fluids having passed through or exiting the third and fourth valves 116' and 118' are mixed and pass through the cooling fan 140' and the third control valve 156'. Then, the working fluids flowing through the two paths are mixed so that the sealing gas is suitable for a sealing condition. The heat exchanger 120' is a heater that consumes electric power, and the cooling fan 140' also consumes electric power. The heat exchanger 120' and the cooling fan 140' are arranged in parallel.

Figure 4:
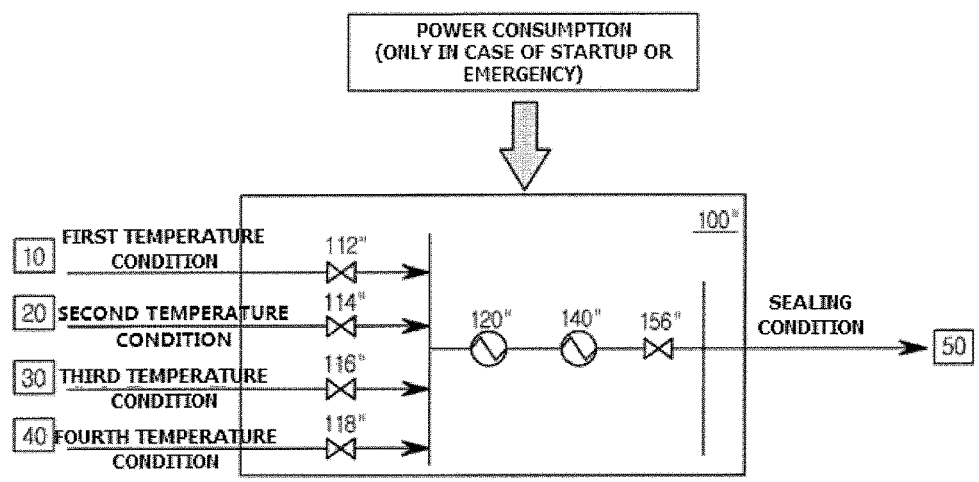
FIG. 4 is a diagram illustrating a third example of the structure of the sealing gas supply apparatus of FIG. 1.

FIG. 4 is a diagram illustrating a third example of the structure of the sealing gas supply apparatus 100 of FIG. 1.

In this example, the sealing gas supply apparatus 100" comprises first to fourth valves 112" to 118", a heat exchanger 120", a cooling fan 140", and a third control valve 156". The sealing gas supply apparatus 100" may form a path, in which the working fluids having passed through the first to fourth valves 112" to 118" are mixed and sequentially pass through the heat exchanger 120" and the cooling fan 140". The sealing gas having passed through the third control valve 156" may be discharged suitably for a sealing condition. To this end, the heat exchanger 120" and the cooling fan 140" are arranged in sequence.

In the sealing gas supply apparatus according to the second and third examples of the first embodiment, the heat exchanger and the cooling fan consume electric power in case of a startup or emergency of the power generation cycle, whereas they do not consume separate electric power during its normal operation.

According to the second embodiment, the paths for the working fluids introduced into the sealing gas supply apparatus may be configured differently from the above examples of the first embodiment, where the detailed description of the same configuration as the above examples will be omitted.

Figure 5:
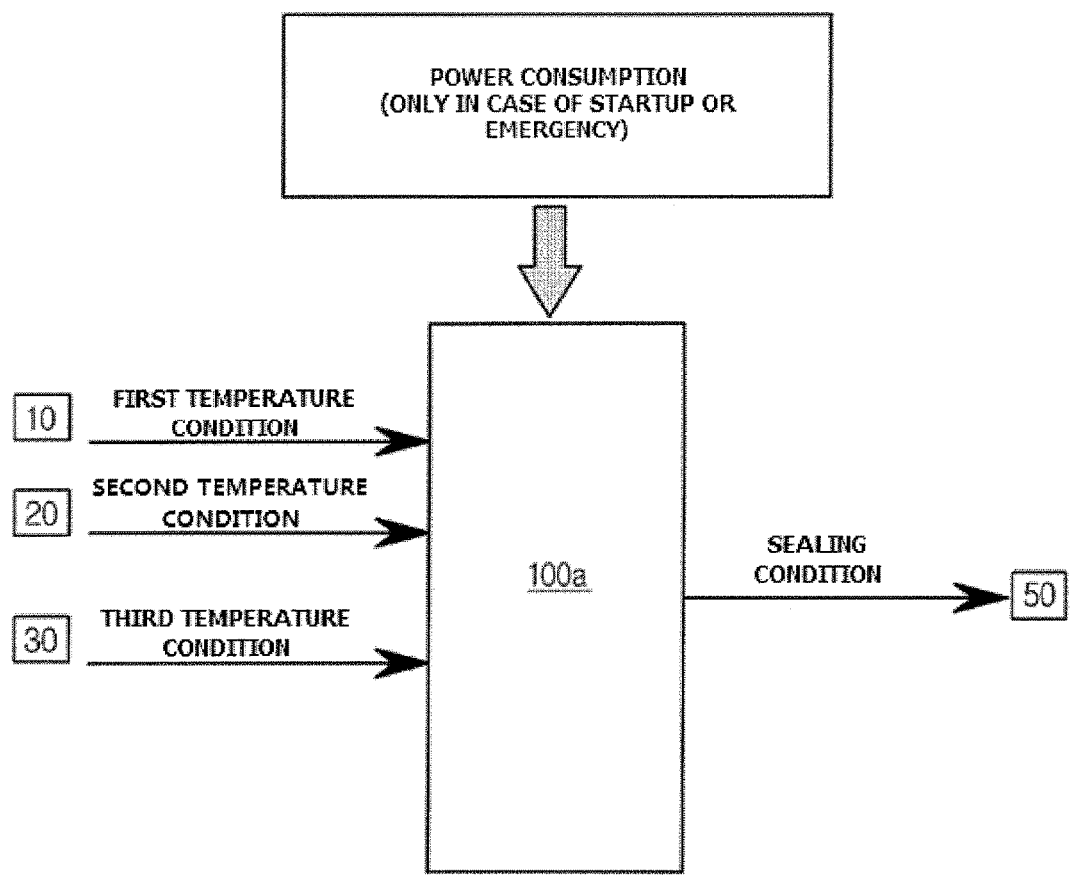
FIG. 5 is a diagram illustrating a sealing gas supply apparatus according to a second embodiment of the present disclosure.
Figure 6:
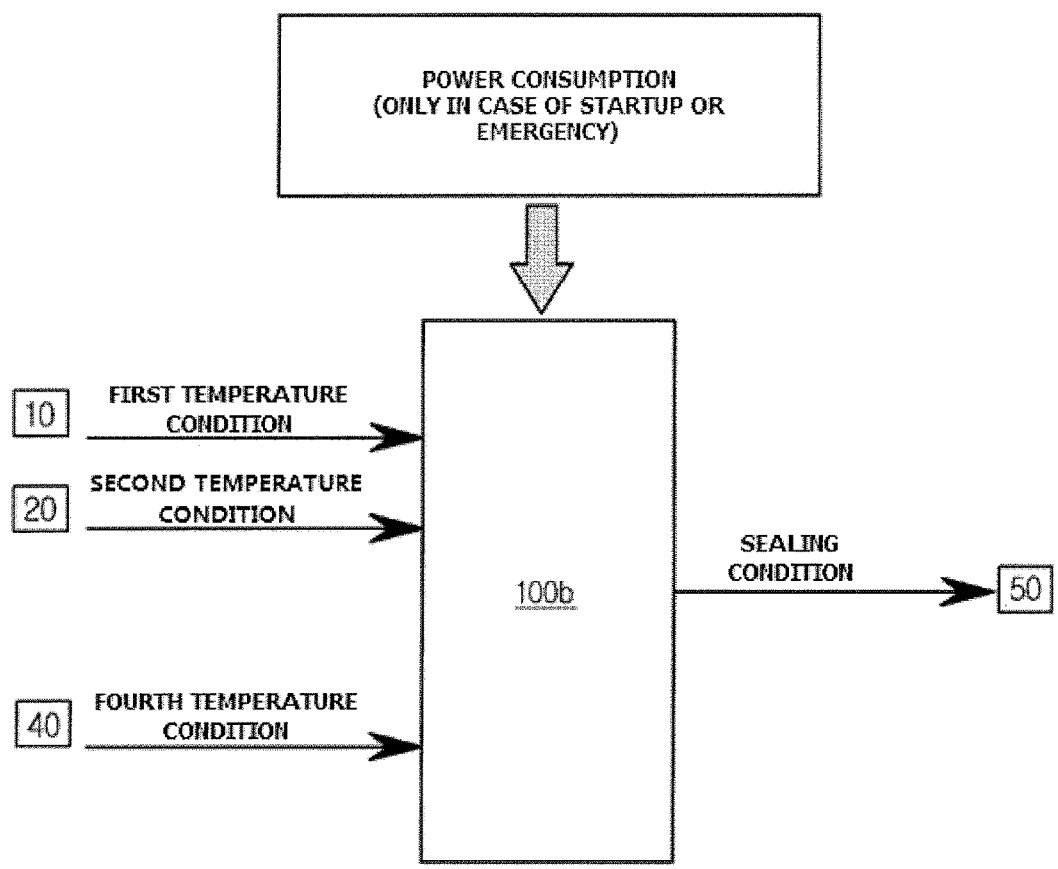
FIG. 6 is a diagram illustrating a sealing gas supply apparatus according to a third embodiment of the present disclosure.
Figure 7:
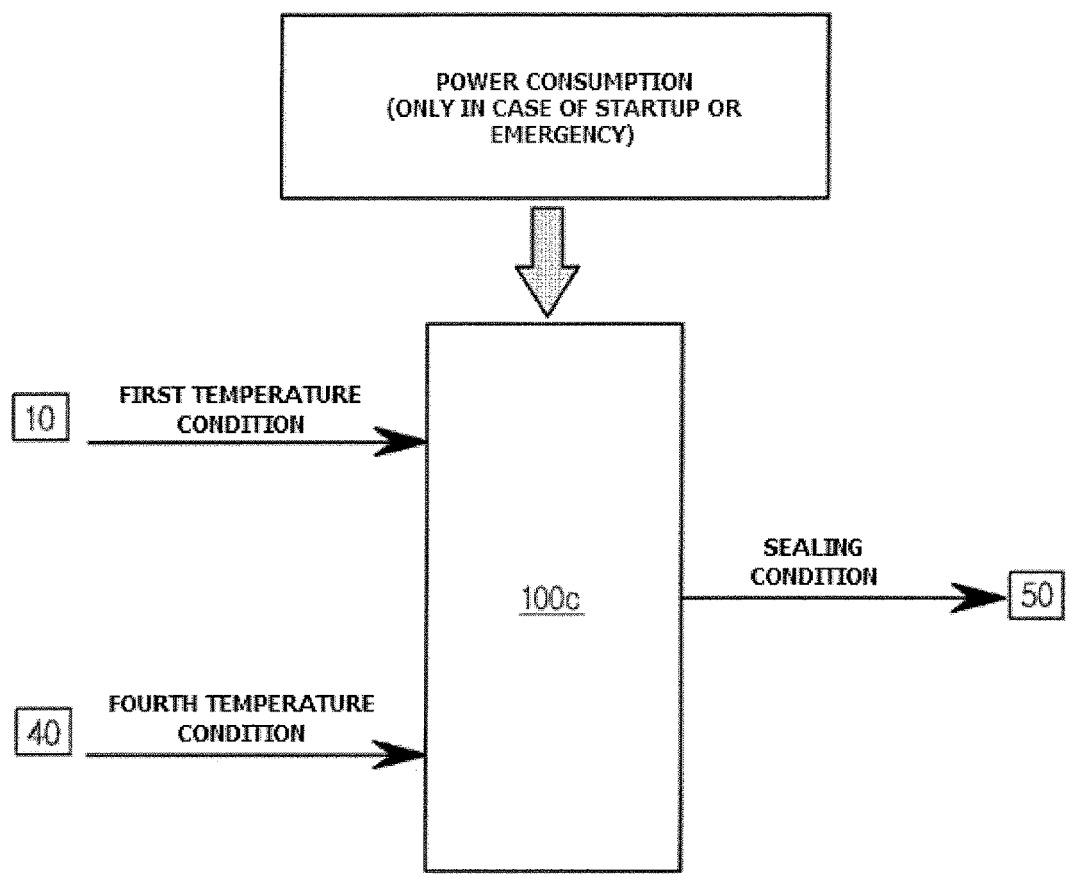
FIG. 7 is a diagram illustrating a sealing gas supply apparatus according to a fourth embodiment of the present disclosure.

FIG. 5 is a diagram illustrating a sealing gas supply apparatus 100*a* according to the second embodiment of the present disclosure. FIG. 6 is a diagram illustrating a sealing gas supply apparatus 100*b* according to a third embodiment of the present disclosure. FIG. 7 is a diagram illustrating a sealing gas supply apparatus 100*c* according to a fourth embodiment of the present disclosure.

As illustrated in FIG. 5, in the sealing gas supply apparatus 100*a* according to the second embodiment of the present disclosure, working fluids are supplied to the sealing gas supply apparatus 100*a* through three paths each under different temperature conditions.

The three paths correspond to the first to third paths in the embodiment according to FIG. 1, and the working fluids may be supplied through the three paths under the first to third temperature conditions identical to those in the embodiment illustrated in FIG. 1.

As illustrated in FIG. 6, three paths correspond to the first, second, and fourth paths in the embodiment illustrated in FIG. 1, and working fluids may be supplied to the sealing gas supply apparatus 100*b* through the three paths under the first, second, and fourth temperature conditions identical to those in the embodiment illustrated in FIG. 1.

As illustrated in FIG. 7, working fluids may be supplied to the sealing gas supply apparatus 100*c* through two paths. In this case, the two paths correspond to the first and fourth paths in the embodiment illustrated in FIG. 1, and the working fluids are supplied to the sealing gas supply apparatus 100*c* under the first and fourth temperature conditions identical to those in the embodiment illustrated in FIG. 1.

That is, it may be possible to control a sealing gas to a temperature suitable for a sealing condition by mixing a low-temperature working fluid with a high-temperature working fluid using a working fluid source having a relatively low temperature and a working fluid source having a relatively high temperature together.

When a single low-temperature working fluid source and only a single high-temperature working fluid source are used, the sealing gas supply apparatus may be configured as follows.

Figure 8:
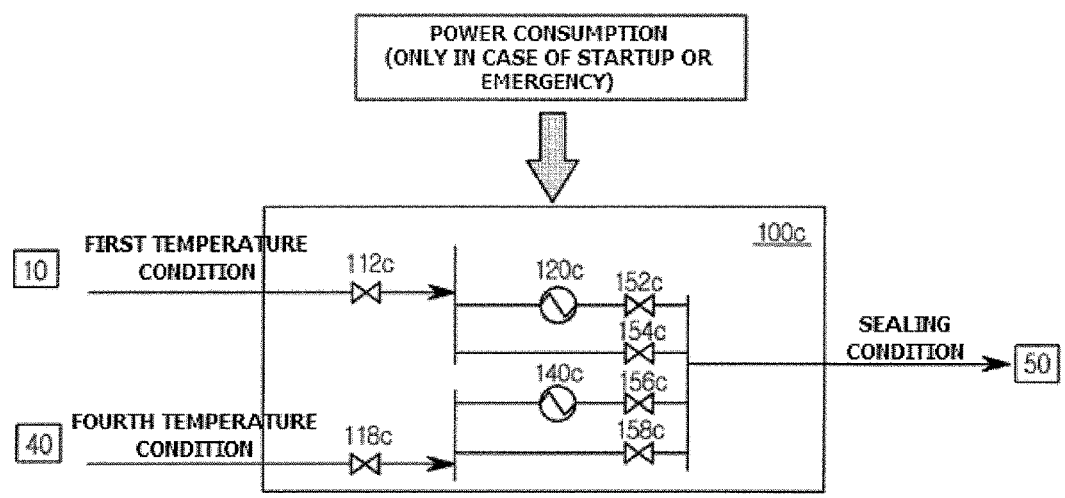
FIG. 8 is a diagram illustrating a first example of the structure of the sealing gas supply apparatus of FIG. 7.
Figure 9:
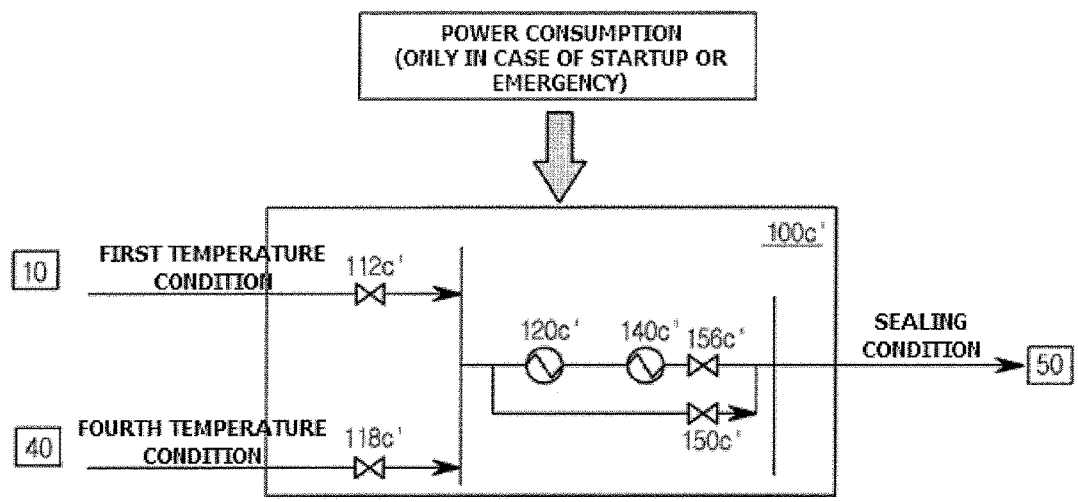
FIG. 9 is a diagram illustrating a second example of the structure of the sealing gas supply apparatus of FIG. 7.
Figure 10:
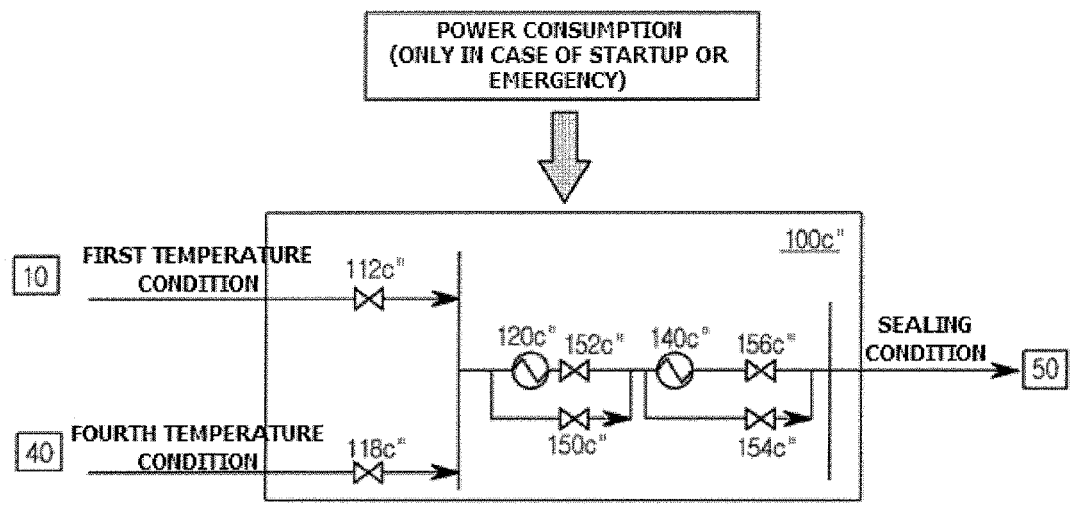
FIG. 10 is a diagram illustrating a third example of the structure of the sealing gas supply apparatus according to FIG. 7.

FIG. 8 is a diagram illustrating a first example of the structure of the sealing gas supply apparatus 100*c* of FIG. 7. FIG. 9 is a diagram illustrating a second example of the structure of the sealing gas supply apparatus 100*c* of FIG. 7. FIG. 10 is a diagram illustrating a third example of the structure of the sealing gas supply apparatus 100*c* of FIG. 7.

As illustrated in FIG. 8, for the control of the flow rate of the working fluid for each supply path, the sealing gas supply apparatus 100*c* comprises a first valve 112*c* that is installed in a working fluid transfer pipe in the first path and a fourth valve 118*c* that is installed in a working fluid transfer pipe in the fourth path.

The working fluid having passed through the first valve 112*c* is branched into two working fluids, where the sealing gas supply apparatus 100*c* forms a path with one of the working fluids sequentially passing through a heat exchanger 120*c* and a first control valve 152*c* as well as a path with the other working fluid passing through a second control valve 154*c*. The working fluid having passed through the fourth valve 118*c* is also branched into two working fluids, where the sealing gas supply apparatus 100*c* forms a path with one of the working fluids sequentially passing through a cooling fan 140c and a third control valve 156c as well as a path with the other working fluid passing through a fourth control valve 158c. The working fluids having passed through the first to fourth control valves 152c to 158c are mixed suitably for a sealing condition and then supplied from the sealing gas supply apparatus 100c to the sealing system 50.

As illustrated in FIG. 9, the sealing gas supply apparatus 100c' comprises a first valve 112c' and a fourth valve 118c', similarly to the example of FIG. 8. The sealing gas supply apparatus 100c' may form a path in which the working fluids having passed through the respective first and fourth valves 112c' and 118c' are mixed and sequentially pass through a heat exchanger 120c' and a cooling fan 140c'. A third control valve 156c' is provided at the outlet of the cooling fan 140c', where the sealing gas supply apparatus 100c' may form a path with the mixed working fluid partially branching from the inlet of the heat exchanger 120c' and then joining at the outlet of the third control valve 156c' after passing through a separate first control valve 150c'. The working fluids having passed through the third control valve 156c' and the first control valve 150c' may be appropriately mixed and discharged suitably for a sealing condition.

As illustrated in FIG. 10, the sealing gas supply apparatus 100c" comprises a first valve 112c" and a fourth valve 118c", similarly to the example of FIG. 8. The working fluids having passed through the respective first and fourth valves may be mixed and supplied to a heat exchanger 120c" and a cooling fan 140c".

The heat exchanger 120c" and the cooling fan 140c" are arranged in sequence, and a first control valve 150c" is installed at the outlet of the heat exchanger 120c" so that the working fluid sequentially passes through them. In this case, the sealing gas supply apparatus 100c" may form a path in which the working fluid is partially branched from the inlet of the heat exchanger 120c" and then joins at the outlet of the first control valve 150c". The working fluid joined with the working fluid having passed through the first control valve 150c" is branched so that a portion thereof flows to the cooling fan 140c" and the rest flows to a third control valve 154c". The cooling fan 140c" and a fourth control valve 156c" are arranged in sequence, where the sealing gas supply apparatus 100c" may form a path with the working fluid having passed through the third control valve 154c" joining with the working fluid having passed through the fourth control valve 156c" at the outlet of the fourth control valve 156c". The working fluid, which is finally joined and mixed, becomes sealing gas suitable for a sealing condition to be discharged from the sealing gas supply apparatus 100c".

As described above, since the low-temperature and high-temperature turbine sealing gas sources are used together, separate or additional electric power is not consumed during its routine or normal operation except for an emergency or start up. Therefore, it may be possible to significantly enhance power generation performance by reducing power consumption.

As is apparent from the above description, since a sealing gas supply apparatus according to exemplary embodiments of the present disclosure does not consume separate electric power during its normal operation by improving a turbine sealing gas source, it may be possible to enhance power generation performance by reducing power consumption.

While the present disclosure has been described with respect to the specific embodiments, it will be apparent to those skilled in the art that various changes and modifications may be made without departing from the spirit and scope of the disclosure as defined in the following claims.

What is claimed is:

1. A sealing gas supply apparatus for supplying a sealing gas to a turbomachine of a power generation system, wherein:
a source comprises at least one low-temperature source for supplying a working fluid to the sealing gas supply apparatus and at least one high-temperature source for supplying a working fluid having a higher temperature than the low-temperature source to the sealing gas supply apparatus; and
the working fluids are mixed in the sealing gas supply apparatus to be suitable for a sealing condition as a temperature condition required in a sealing system of the turbomachine, by heating the working fluid supplied from the low-temperature source and cooling the working fluid supplied from the high-temperature source, so as to be supplied to the sealing system of the turbomachine,
wherein the sealing gas supply apparatus further comprises
a first valve installed in a working fluid transfer pipe connected to the low-temperature source, a heat exchanger through which the working fluid passing through the first valve passes, and a first control valve for controlling a flow rate of the working fluid passing through the heat exchanger and the first valve,
a second valve installed in a working fluid transfer pipe connected to the high-temperature source, a cooling fan through which the working fluid passing through the second valve passes, and a second control valve for controlling a flow rate of the working fluid passing through the cooling fan and the second valve.

2. The sealing gas supply apparatus according to claim 1, wherein the low-temperature source is a working fluid supply pump, which is connected to a storage tank storing the working fluid, or a main pump of the power generation system, and the high-temperature source is a turbine inlet or recuperator outlet of the power generation system.

3. The sealing gas supply apparatus according to claim 1, wherein the heat exchanger and the cooling fan are operated only in case of startup or emergency of the power generation system.

4. The sealing gas supply apparatus according to claim 3, further comprising a first valve installed in a working fluid transfer pipe connected to the low-temperature source, a second valve installed in a working fluid transfer pipe connected to the high-temperature source, a heat exchanger through which the working fluid mixed through the first and second valves passes, a cooling fan through which the working fluid passing through the heat exchanger passes, a first control valve for controlling a flow rate of the working fluid branched from an inlet of the heat exchanger, and a second control valve for controlling a flow rate of the working fluid passing through the cooling fan, wherein the working fluids passing through the first and second control valves are mixed suitably for the sealing condition to be supplied to the sealing system.

5. The sealing gas supply apparatus according to claim 3, further comprising a first valve installed in a working fluid transfer pipe connected to the low-temperature source, a second valve installed in a working fluid transfer pipe connected to the high-temperature source, a heat exchanger through which the working fluid mixed through the first and second valves passes, a cooling fan through which the working fluid passing through the heat exchanger passes, a second control valve disposed at an outlet of the heat exchanger, a fourth control valve disposed at an outlet of the cooling fan, a first control valve for controlling a flow rate of the working fluid branched from an inlet of the heat exchanger, and a third control valve for controlling a flow rate of the working fluid branched from an inlet of the cooling fan.

6. The sealing gas supply apparatus according to claim 5, wherein the working fluid passing through the first control valve joins at an outlet of the second control valve, and the working fluid passing through the third control valve joins at an outlet of the fourth control valve.

7. The sealing gas supply apparatus according to claim 1, wherein the working fluids passing through the respective control valves are mixed suitably for the sealing condition to be supplied to the sealing system.

8. A sealing gas supply apparatus for supplying a sealing gas to a turbomachine, wherein:
a source comprises a plurality of low-temperature sources for supplying working fluids to the sealing gas supply apparatus and a plurality of high-temperature sources for supplying working fluids having a higher temperature than the low-temperature sources to the sealing gas supply apparatus; and
the working fluids supplied from the respective low-temperature and high-temperature sources are heated or cooled through heat exchange therebetween to be suitable for a sealing condition as a temperature condition required in a sealing system of the turbomachine, by heating the working fluid supplied from the low-temperature source and cooling the working fluid supplied from the high-temperature source, so as to be supplied to the sealing system,
wherein the low-temperature sources are a working fluid supply pump, which is connected to a storage tank storing the working fluid, and a main pump of a power generation cycle, and the high-temperature sources are a turbine inlet and recuperator outlet of the power generation cycle.

9. The sealing gas supply apparatus according to claim 8, further comprising a heat exchanger for heating the working fluids supplied from the low-temperature sources, and a cooling fan for cooling the working fluids supplied from the high-temperature sources.

10. The sealing gas supply apparatus according to claim 9, wherein the heat exchanger and the cooling fan are operated only in case of startup or emergency of the power generation cycle.

11. The sealing gas supply apparatus according to claim 10, further comprising first and second valves installed in respective working fluid transfer pipes connected to the low-temperature sources, a heat exchanger through which a portion of the working fluids passing through the first and second valves passes, and control valves for respectively controlling a flow rate of the working fluid passing through the heat exchanger and a flow rate of the working fluid which does not pass through the heat exchanger.

12. The sealing gas supply apparatus according to claim 10, further comprising first and second valves installed in respective working fluid transfer pipes connected to the low-temperature sources, third and fourth valves installed in respective working fluid transfer pipes connected to the high-temperature sources, a heat exchanger through which the working fluids passing through the first and second valves pass, a first control valve disposed at an outlet of the heat exchanger to control a flow rate of the working fluid passing through the heat exchanger, a cooling fan through which the working fluids passing through the third and fourth valves pass, and a third control valve disposed at an outlet of the cooling fan to control a flow rate of the working fluid passing through the cooling fan.

13. The sealing gas supply apparatus according to claim 12, wherein the working fluids passing through the first and third control valves are mixed suitably for the sealing condition to be supplied to the sealing system.

14. The sealing gas supply apparatus according to claim 10, further comprising first and second valves installed in respective working fluid transfer pipes connected to the low-temperature sources, third and fourth valves installed in respective working fluid transfer pipes connected to the high-temperature sources, a heat exchanger through which the working fluids passing through the first to fourth valves pass, a cooling fan installed at an outlet of the heat exchanger, and a third control valve installed at an outlet of the cooling fan to control a flow rate of the working fluid passing through the cooling fan.

15. The sealing gas supply apparatus according to claim 11, further comprising third and fourth valves installed in respective working fluid transfer pipes connected to the high-temperature sources, a cooling fan through which a portion of the working fluids passing through the third and fourth valves passes, and control valves for respectively controlling a flow rate of the working fluid passing through the cooling fan and a flow rate of the working fluid which does not pass through the cooling fan.

16. The sealing gas supply apparatus according to claim 12, wherein the working fluids passing through the respective control valves are mixed suitably for the sealing condition to be supplied to the sealing system.

* * * * *